United States Patent

[11] 3,559,776

| [72] | Inventor | Harold E. Schultze |
| | | Dayton, Ohio |
| [21] | Appl. No. | 833,956 |
| [22] | Filed | June 17, 1969 |
| [45] | Patented | Feb. 2, 1971 |
| [73] | Assignee | General Motors Corporation |
| | | Detroit, Mich. |
| | | a corporation of Delaware |

[54] SHOCK LOCKOUT AND PISTON SYSTEM
6 Claims, 13 Drawing Figs.

[52] U.S. Cl. .................................................. 188/299, 188/96
[51] Int. Cl. ..................................................... F16f 9/10
[50] Field of Search ........................................... 188/88.502, 88.505, 96.51, 96.21

[56] References Cited

UNITED STATES PATENTS

| 2,453,855 | 11/1948 | Oliver | 188/96(.21) |
| 2,657,770 | 11/1953 | Rossman | 188/88(.505) |

FOREIGN PATENTS

| 778,282 | 7/1957 | Great Britain | 188/88(.502) |

Primary Examiner—George E. A. Halvosa
Attorneys—William S. Pettigrew and John C. Evans ABSTRACT: In preferred form, a direct acting hydraulic shock absorber including a reciprocal piston which has a valve element normally maintained in a closed position by a spring and movable to an open position to regulate fluid flow between rebound and compression chambers in response to a predetermined pressure in the chambers. The valve element has a small diameter end and a larger diameter end integrally joined by a variable diameter intermediate portion. During normal shock absorber operation fluid pressure within the rebound chamber and the compression chamber acts against the intermediate portion and the small diameter end respectively of the valve element to move it to an open position against the force of the spring. A pilot valve in the piston is selectively rotated by reversible drive means between a normal and a lockout position. In the lockout position, fluid pressure in the rebound chamber and the compression chamber is transmitted by the pilot valve against the larger diameter and of the valve element. This pressure force counterbalances the aforementioned pressure forces on the small diameter end and the intermediate portion of the valve element to hold the valve in a closed position and consequently to prevent subsequent extension or contraction of the shock absorber.

PATENTED FEB 2 1971  3,559,776

INVENTOR.
Harold E. Schultze
BY J. C. Evans
ATTORNEY

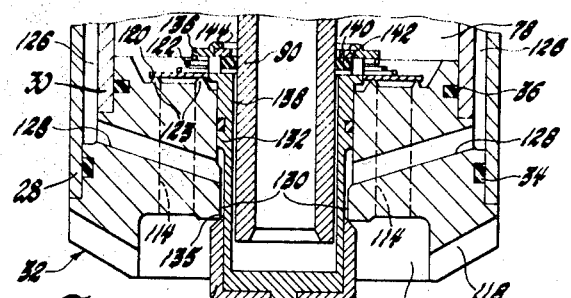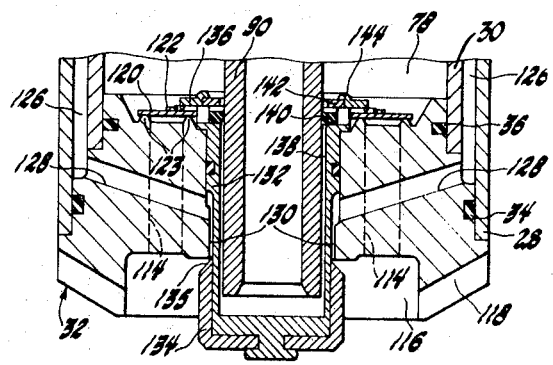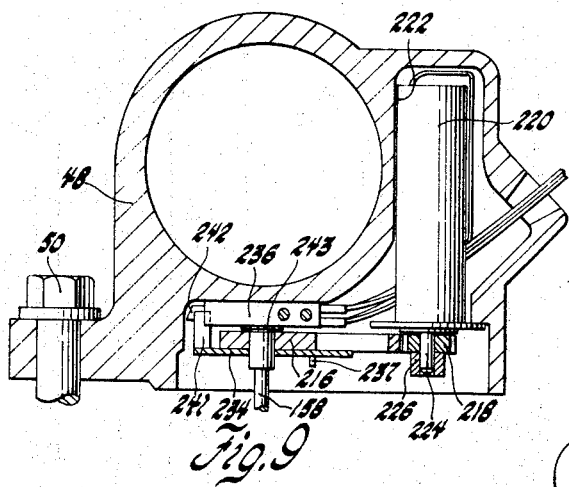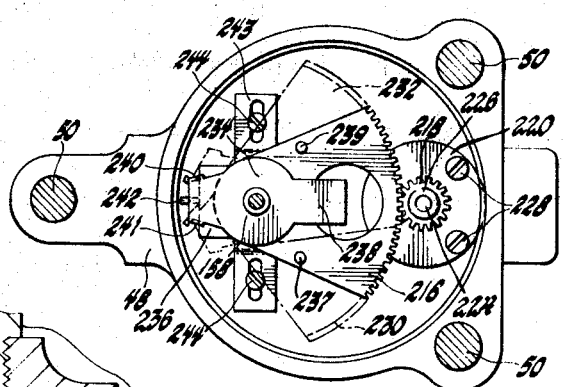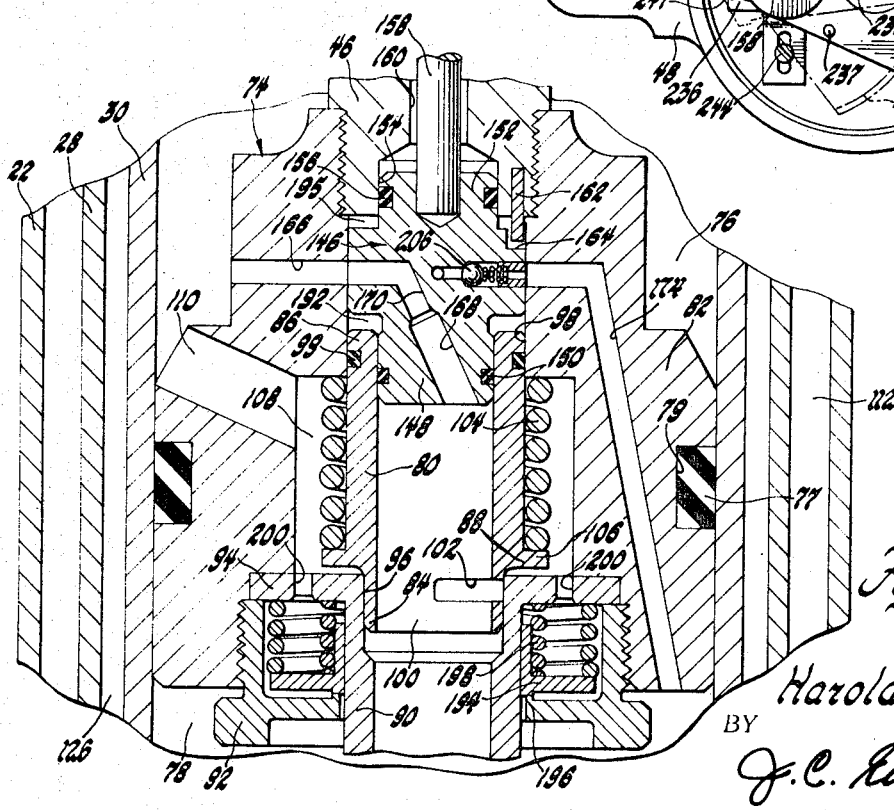

INVENTOR.
Harold E. Schultze
BY
J.C. Evans
ATTORNEY

SHOCK LOCKOUT AND PISTON SYSTEM

This invention relates to a direct acting hydraulic shock absorber and, more particularly, to a shock absorber which may be selectively altered from a normal dampening mode of operation to a lockout mode in which piston reciprocation is precluded.

In particular shock absorber applications, it is desirable to selectively lock the suspension system and associated shock absorbers in a preattained position. For example, in off-road vehicles such as tractors it is often advantageous to lockout the suspension system from further movement. This lockout feature also has utility in a fire fighting vehicle and in a ditch digging vehicle.

The subject shock absorber can be selectively altered by remote means from a normal dampening mode of operation to a lockout mode which prevents movement between the sprung and unsprung masses of the vehicle. The lockout mode is effected by energizing a DC drive motor within the shock absorber which pivots a pilot valve in the piston from a normal dampening position to a lockout position. In the lockout position, the pilot valve transmits fluid pressure from the shock absorber rebound and compression chambers against an end of a flow regulating valve also in the piston to prevent the valve from opening. During a normal dampening mode of operation the valve opens to regulate fluid flow between the shock absorber rebound chamber and the compression chamber which dampens movement between the sprung and unsprung masses of the vehicle. By preventing fluid flow through this valve and between these chambers during a lockout mode, piston reciprocation within the shock absorber and consequential movement between sprung and unsprung masses of the vehicle are precluded.

The aforesaid DC motor is located in an upper portion of the shock absorber. The motor pivots the pilot valve between the normal dampening and lockout positions through gears and a valve rod. The valve rod extends concentrically through the piston rod and has a gear sector on its upper end and the pilot valve on the lower end. The small DC motor has a spur gear attached to its drive shaft which pivots a gear sector affixed on an upper end of the valve rod. Resultant turning of the valve rod pivots the attached pilot valve within the piston.

An electric circuit which controls energization of the DC motor includes a double pole-double throw (DPDT) switch attached to the motor leads which is thrown between its opposite terminals by the motion of the gear sector and a single pole-double throw (SPDT) switch which is adapted for manual operation by the vehicle operator. The DPDT switch in cooperation with the SPDT switch and the circuit automatically deenergizes the DC motor after the gear sector has pivoted a predetermined maximum angular distance and reverses the polarity of the motor leads. Manual operation of the SPDT switch reenergizes the DC motor when a mode change is desired to effect rotation of the gear sector and pilot valve. Indicator lights in the circuit indicate when the shock absorber is in a normal dampening mode or a lockout mode.

Therefore, an object of the inventor is to provide a direct acting hydraulic shock absorber having a normal dampening mode of operation during which time fluid flow through the shock absorber piston is regulated by a normally closed spring biased valve opened in response to pressure forces on the valve from fluid within the rebound and compression chambers and alternately having a lockout mode of operation during which time the valve is maintained in its spring biased closed position by a pilot valve which transmits fluid pressure forces from the rebound and compression chambers against the fluid regulating valve to counterbalance the first mentioned fluid pressure forces on the valve.

A further object of the inventor is to provide a direct acting hydraulic shock absorber which can be selectively altered from a normal dampening mode of operation to a lockout mode of operation by the action of a reversible DC motor in the shock absorber which pivots a pilot valve between a normal dampening position and a lockout position which is energized to rotate in opposite directions by an electrical circuit including a switch within the shock absorber thrown in response to rotation of the DC motor and a manually thrown switch in the vehicle interior.

Further objects and advantages of the subject invention will be apparent from the following description, reference being made to the accompanying drawings wherein a preferred embodiment of the present invention is clearly shown. In the drawings:

FIG. 3 is an enlarged vertical view in section of the piston revealed in FIG. 2;

FIG. 6 is an enlarged vertical view in section of the base valve assembly of the shock absorber in a normally closed position;

FIG. 7 is an enlarged vertical view in section of the base valve assembly of the shock absorber in an open position;

FIG. 8 is a horizontal view in section taken along section line 8—8 of FIG. 2;

FIG. 9 is a vertical view in section of the upper end cap of the chock absorber;

Figure 1:
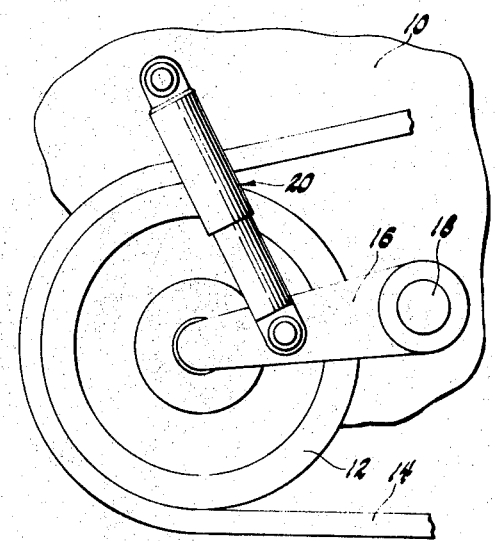
FIG. 1 is a fragmentary view of the subject shock absorber in a suspension system of a tracked vehicle.

In FIG. 1 of the drawings, an off-road vehicle 10 is illustrated including a wheel 12 and a track 14. Wheel 12 is supported for rotation on an end of a road arm 16. The road arm 16 is attached at another end to a torsion bar 18 to provide spring suspension for the vehicle 10. Torsion bar 18 extends laterally through the vehicle and is attached to an opposite side of the vehicle 10. A shock absorber assembly 20 is pivotally affixed at an upper end to the vehicle 10 (the sprung mass) and at a lower end to the road arm 16 (the unsprung mass) to normally damp relative movement therebetween.

Figure 2:
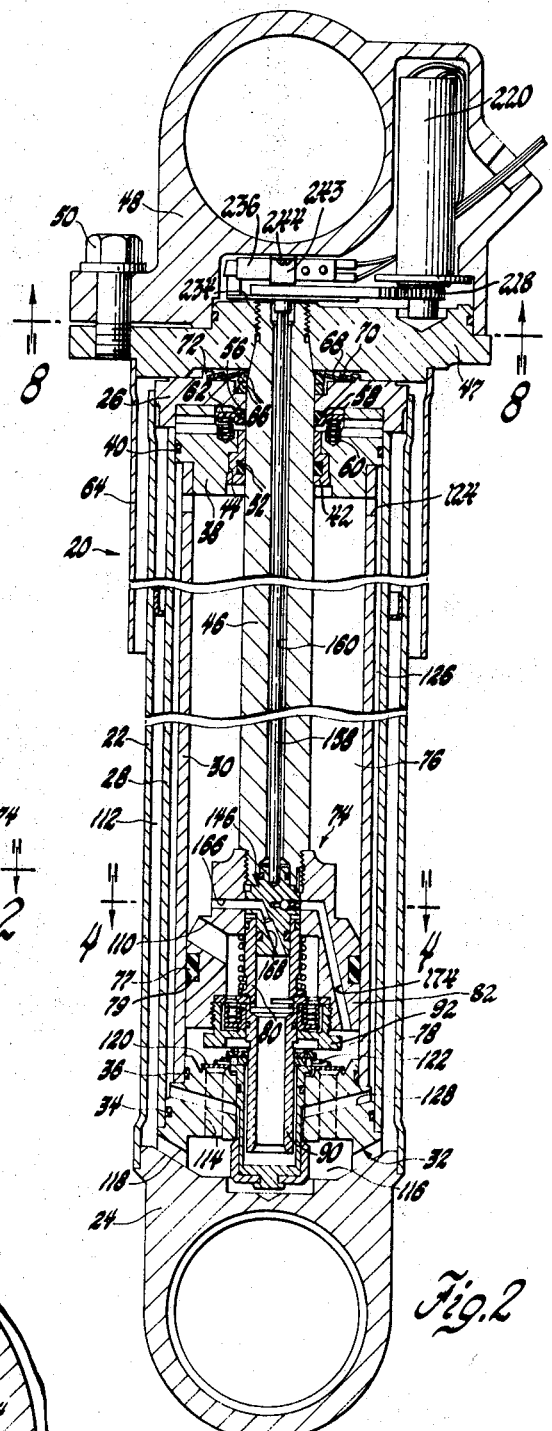
FIG. 2 is a vertical view in section of the shock absorber in a fully collapsed position.

As shown in FIG. 2, the shock absorber assembly 20 includes a cylindrical reservoir tube 22 which is attached at its lower end to an end fitting 24 in a fluid tight manner. Fitting 24 is adapted to pivotally secure the shock absorber assembly 20 to the road arm 16. The top end of the reservoir tube 22 is attached to an end cover 26 in a fluid tight manner.

Concentrically positioned within reservoir tube 22 is a smaller diameter bypass tube 28 and concentrically positioned with the bypass tube 28 in is a pressure cylinder tube 30. A base valve assembly 32 is held within the lower ends of the bypass tube 28 and the pressure cylinder tube 30 by the end fitting 24. O-rings 34 and 36 are compressed between the base valve assembly 32 and tubes 28 and 30 to insure a leak resistant juncture therebetween.

A piston rod guide 38 is supported in the upper ends of the bypass tube 28 and the pressure cylinder tube 30. O-ring 40 is compressed between bypass tube 28 and the rod guide 38 to insure a leak resistant juncture therebetween. A bushing 42 is supported within a bore 44 in the rod guide 38. A reciprocal piston rod 46 is concentrically positioned within the pressure cylinder tube 30 by the bushing 42 and rod guide 38. The upper end of the piston rod 46 extends through end cover 26 and is threadably attached to an upper plate 47. Plate 47 is fastened to an upper end fitting 48 by a plurality of bolts 50 (only one of which is shown). Fitting 48 is adapted to pivotally attach the shock absorber assembly 20 to the sprung mass of the vehicle 10. An O-ring 52 and the bushing 42 sealingly surround the piston rod 46 to prevent fluid leakage therebetween.

The piston rod guide 38 is held against the upper ends of the bypass tube 28 and the pressure cylinder tube 30 by the circular end cover 26 which is attached to the upper end of reservoir tube 22. An annular piston rod seal 56 encircles the piston rod 46 and is interposed between the piston rod guide 38 and the end cover 26 to prevent hydraulic fluid leakage from the shock absorber interior. More particularly, seal 56 is biased against an end surface 58 of end cover 26 by plurality of coil springs 60. A force distribution washer 62 between the coil springs 60 and the seal 56 evenly distributes the force of the springs against the seal.

The piston rod 46 is protected from dirt and flying objects by a cylindrical dust shield 64 which surrounds reservoir tube 22 and is attached at an upper end to plate 47. Dirt is further prevented from entering the shock absorber by a pair of annular scraper 66 on the top end surface of the cover 26. The scraper rings 66 sealingly encircle the piston rod 46 and are biased against the piston rod by a resilient washer spring 68 and a washer 70. A spunover portion 72 of cover 26 secures the outer edge of washer 72 to the end of the cover 26.

A valved piston 74 is concentrically supported for reciprocal movement within the pressure cylinder tube 30 and is attached to the lower end of piston rod 46. A variable volume rebound chamber 76 is formed within the pressure cylinder tube 30 between rod guide 38 and the valved piston 74. A variable volume compression chamber 78 is formed within the pressure cylinder tube 30 between the base valve assembly 32 and the valved piston 74. Both chambers 76 and 78 are completely filled with hydraulic fluid during normal shock absorber operation. An O-ring seal 77 is located in a peripheral channel 79 between the piston 74 and the pressure cylinder tube 30 to prevent fluid leakage therebetween.

Movement of the valved piston 74 toward rod guide 38 necessarily decreases the volume of the rebound chamber 76. Likewise, movement of the valved piston 74 toward base valve assembly 32 decreases the volume of the compression chamber 78. A tubular valve element 80 (as best seen in FIG. 3) is mounted within piston 74 to regulate the flow of hydraulic fluid between chambers 76 and 78 caused by reciprocation of the piston 74 within pressure cylinder tube 30. This regulation of hydraulic fluid flow through piston 74 produces a predetermined dampening of relative movement between sprung and unsprung masses of the associated vehicle.

More particularly the valved piston 74 includes a cup-shaped cylindrical portion 82 which is threadably attached to the lower end of the piston rod 46 for reciprocation together. Valve 80 is supported within portion 82 and has a small diameter end 84, a large diameter end 86 and an intermediate portion 88 which is characterized by a conically-shaped variable diameter surface. A depending compression cutoff tube 90 on the lower end of portion 82 extends into compression chamber 78. An annular collar 92 which is threadably attached to portion 82 holds a peripheral flange 94 on the cutoff tube 90 to portion 82. The small end 84 of the valve 80 extends into a bore 96 in the cutoff tube 90. The large diameter end 86 of the valve 80 extends into a bore 98 in portion 82. The valve 80 has a hollow interior 100 and a cutout portion 102 adjacent its small diameter end. The intermediate portion 88 of valve 80 is biased downward against the upper end of cutoff tube 90 by a coil spring 104. Spring 104 encircles the valve 80 and is compressed between portion 82 and a peripheral flange 106 on the valve 80. A spring chamber 108 within the portion 82 surrounds the valve 80 and is fluidly connected by port 110 to the rebound chamber 76.

When the valve 80 is in its closed position, as shown in FIG. 3, fluid flow between chambers 76 and 78 and through cutout 102 is blocked by the bore 96. During a normal compression stroke, fluid pressure in the compression chamber 78 presses against the small diameter end 84 of valve 80. A predetermined pressure slides the valve 80 upward against the force of spring 104 to move the cutout 102 into spring chamber 108. This permits fluid to flow from compression chamber 78 through cutout 102, into spring chamber 108, through port 110 and into the rebound chamber 76. During a normal rebound stroke, fluid pressure in rebound chamber 76 is transmitted through port 110 into spring chamber 108 where it presses against the intermediate portion 88 of valve 80. A predetermined pressure slides the valve 80 upward against the force of spring 104 to move the cutout 102 into spring chamber 108. This permits fluid to flow from the rebound chamber 76, through port 110, into spring chamber 108, through cutout 102 and into the compression chamber 78. Movement of valve 80 is not effected by pressure on the surfaces of flange 106 since pressure forces on opposite surfaces counterbalance one another.

Movement of the piston rod 46 downward within pressure cylinder tube 30 causes a decrease in the compression chamber volume greater than the corresponding increase in the rebound chamber volume. Likewise, on upward piston rod movement the increase in the compression chamber volume is greater than the corresponding decrease in the rebound chamber volume. The volume differential in each case equals the displacement of the piston rod 46 entering or exiting the rebound chamber 76. Because of this, a supplementary quantity of fluid must be supplied to the compression chamber 78 upon movement of the piston rod 46 upward in pressure cylinder tube 30. Likewise, fluid must be withdrawn from the compression chamber 78 upon downward movement of piston rod 46 within pressure cylinder tube 30. A reservoir chamber 112 is located in the annular space between the reservoir tube 22 and the bypass tube 28 to store this supplementary fluid.

The base valve assembly 32, as shown in FIG. 6, is located within the lower end of pressure cylinder tube 30 to regulate the flow of fluid between the chambers 76, 78 and the reservoir chamber 112. During a rebound stroke, fluid is supplied to the compression chamber 78 through axially extending inlet ports 114 in the base valve assembly 32. Inlet ports 114 extend from the compression chamber 78 through the base valve assembly 32 to a space 116 which is fluidly connected through cutout ports 118 to the reservoir chamber 112. An annular valve 120 is biased by a coil spring 122 against valve seats 123 which encircle the upper openings of inlet ports 114. Valve 120 allows fluid to flow from the reservoir chamber 112, through space 116 and ports 114 into compression chamber 78 but prevents backflow of fluid from the compression chamber 78 to the reservoir chamber 112.

During a compression stroke, a portion of the fluid which flows into rebound chamber 76 is withdrawn from the rebound chamber and transferred into the reservoir chamber 112. As previously explained, this fluid storage is necessary because the piston rod 46 displaces space within the rebound chamber. The excess fluid is withdrawn from rebound chamber 76 through a bypass port 124 in the upper wall of pressure cylinder tube 30. This fluid then flows through a passageway 126 defined between the bypass tube 28 and the pressure cylinder tube 30 and into ports 128 in the base valve assembly 32. The ports 128 extend radially through the base valve assembly 32 and intersect a central bore 130. A reciprocal valve 132 is supported within the bore 130 and a valve seat 134 is attached to the lower end of valve 132. The valve 132 is in the open position, as shown in FIG. 7, during the compression stroke when valve seat 134 is away from the end of bore 130 to allow fluid flow between the space 116 and passage 128. Coil spring 122 which is compressed between the inlet valve 120 and a flange 136 normally biases the valve 132 into a closed position. During the compression stroke, a pressure force in chamber 78 bears against the upper end surface of valve 132. This pressure force moves valve 132 downward against the force of spring 122 and opens a passage between the end 135 of the valve seat 134 and bore 130 between which fluid from chamber 76 displaced by the piston rod may flow to the reservoir chamber. Thus when valve 132 is open, fluid flows from rebound chamber 76, through bypass port 124, through passage 126, through port 128, into space 116, through cutout port 118 and into the reservoir chamber 112. When the valve 132 is in a closed position during the rebound stroke, as shown in FIG. 6, the aforementioned fluid flow is blocked by valve 132.

The function of the compression cutoff tube 90 is to prevent undesirable contact between the piston 74 and the base valve assembly 32. As cutoff tube 90 moves into bore 138 near the end of a compression stroke, an annular seal 140 encircles the outer surface of the cutoff tube to restrict fluid flow therebetween. Seal 140 is retained on the upper end of valve element 132 by a retaining washer 142 and a spun-over portion 144. Further movement of the tube 90 into bore 138 causes the seal 140 to reduce this flow passage and to consequentially reduce fluid flow through tube 90 between chambers 76 and 78. This blockage of fluid flow gently halts downward movement of the piston 74 in pressure cylinder tube 30.

In particular shock absorber applications it is desirable to lockout the shock absorber to prevent reciprocation of the piston 74 within the pressure cylinder tube and to prevent movement between the sprung and unsprung masses of an associated vehicle. In the shock absorber assembly 20, lockout means include a rotatable pilot valve 146 within piston 74 as is best illustrated in FIG. 3. Pilot valve 146 has a lower portion 148 adapted to rotate in the hollow interior 100 of valve 80. An O-ring 150 between this portion 148 and the valve 80 resists fluid leakage therebetween. An upper portion 152 of the pilot valve 146 is adapted to rotate within a bore 154 in the end of the piston rod 46. An O-ring 156 between the portion 152 and the piston rod 46 resists fluid leakage therebetween.

Figure 4:
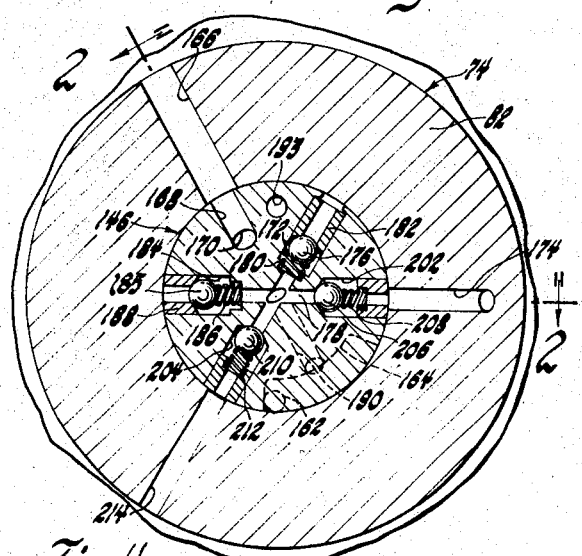
FIG. 4 is an enlarged horizontal view in section taken along section line 4—4 of FIG. 2 and showing the rotatable pilot valve of the shock absorber in a normal dampening position.
Figure 5:
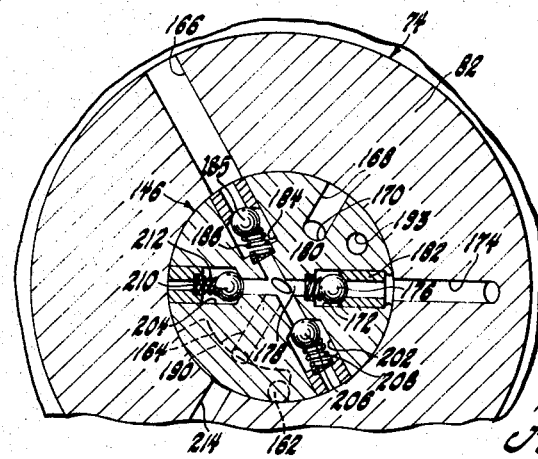
FIG. 5 is an enlarged horizontal view in section taken along section line 4—4 of FIG. 2 showing the rotatable pilot valve of the shock absorber in a lockout position.

The pilot valve 146 is pivoted between a normal dampening position and a lockout position by a valve rod 158 which axially extends through a central bore 160 within the piston rod 46. A pin 162 affixed in the end of piston rod 46 extends into a semiannular groove 164 in the pilot valve to limit the rotation of the pilot valve 146 to normal and lockout positions. The annular relation of the pilot valve 146 with respect to the portion 82 in normal and lockout positions is shown in FIGS. 4 and 5 respectively. The pilot valve 146 and the valve rod 158 is pivoted between the normal and lockout positions by reversible drive means which will subsequently be discussed in more detail.

During the damping mode of operation, an initial flow of fluid between the rebound chamber 76 and the compression chamber 78 commences through a passage 166 in portion 82 and through an L-shaped port 168 within the pilot valve 146. When the pilot valve 146 is in the dampening position shown in FIG. 4, passage 166 and port 168 are aligned. Port 168 has a small diameter restriction 170 which limits fluid flow through the pilot valve.

Shock absorber lockout occurs when piston 74 is prevented from reciprocating within pressure cylinder tube 30. This lockout mode of operation is effected by pivoting the pilot valve 146 from an angular position shown in FIG. 4 to the position shown in FIG. 5. In this position, the port 168 and the passage 166 are not aligned and the port 168 is blocked by portion 82. A passage 172 in the pilot valve 146 is aligned with an L-shaped passage 174 in piston 74. Passage 174 communicated the pilot valve with the compression chamber 78. A ball check valve 176 within passage 172 permits fluid flow from the compression chamber 78 to an interior space 178 within the pilot valve 146. A spring 180 normally biases the valve 176 against a valve seat 182 to prevent fluid flow from the interior space 178 into passage 174. Another passage 184 in the pilot valve 146 is aligned with the passage 166 during shock absorber lockout. Passage 166 extends through the piston 74 to the rebound chamber 76. A ball check valve 185 within passage 184 permits fluid flow from rebound chamber 76 to the interior space 178. A spring 186 normally biases the valve 176 against a valve seat 188 to prevent fluid flow from interior space 178 into passage 166. Consequently, interior space 178 is fluidly connected by the passages 172, 174 and 166 and 184 to the compression chamber 78 and rebound chamber 76 respectively during shock absorber lockout. A passage 190 extends from interior space 178 to a lockout chamber 192. Chamber 192 is adjacent the large diameter end 86 of valve 80.

During a lockout mode of operation, fluid pressure is transmitted from the chambers 76 and 78 through passages 166, 184, 172, 174 and 190 to the lockout chamber 192. This pressure acts against the large diameter end 86 of valve 80 to counterbalance the aforesaid pressure forces upon the small diameter end 84 and the intermediate portion 88 of the valve 80. With fluid pressure forces on valve 80 counterbalanced, the coil spring 104 is able to maintain the valve element 80 and cutout port 102 closed. Reciprocation of the piston 74 within the pressure cylinder tube 30 ordinarily is made impossible with valve 80 maintained in its closed position and, consequentially, relative movement between the sprung and unsprung masses of an associated vehicle is precluded.

A port 193 extends axially through the pilot valve between the lockout chamber 192 and a chamber 195. Chamber 195 is defined between the pilot valve 146 and the end of the piston rod 46. By fluidly connecting chambers 192 and 195, axial pressure forces on the pilot valve in these chambers are counterbalanced.

While in the lockout mode of operation, a pressure level in the compression chamber 78 above a predetermined maximum is undesirable. To prevent the formation of such an undesirable pressure, a relief valve 194 in piston 74 is provided. The relief valve 194 encircles the cutoff tube 90 and is normally held in a closed position against a valve seat 196 on collar 92 by a plurality of coil springs 198. When the pressure in chamber 78 exceeds the predetermined maximum, relief valve 194 is moved upward against the coil springs 198 to an open position which permits fluid flow into the rebound camber 76 through ports 200 in flange 94 of the cutoff tube 90.

When a return to the dampening mode of operation is desired, the pilot valve 146 is rotated to the position shown in FIG. 4. In this position, port 168 is once again aligned with passage 166 connecting the rebound chamber 76 with the compression chamber 78. Passages 172 and 184 are blocked by portion 82 to prevent transmission of fluid pressure to the lockout chamber 192. To relieve the lockout chamber 192 of pressure introduced during the lockout mode of operation, relief passages 202 and 204 in the pilot valve 146 are connected to the compression chamber 78 and the rebound chamber 76, respectively. More particularly, the passage 202 is aligned with passage 174 which extends to the compression chamber. A ball check valve 206 which is normally held in a closed position by a spring 208 releases fluid pressure from the lockout chamber 192 to the compression chamber 78. Likewise, a ball check valve 210 which is normally held in a closed position by a spring 212 releases fluid pressure from the lockout chamber 192 into the rebound chamber 76. Check valves 206 and 210 prevent fluid flow from chambers 78 and 76 into the lockout chamber 192. Thus, when the pilot valve 146 is in a normal damping position, the valve 80 is free to move against coil spring 140 to an open position in response to pressures in chambers 76 and 78.

The pilot valve 146 is pivoted between the normal damping position and the lockout position by the valve rod 158 which axially extends through the piston rod 46. As illustrated in FIGS. 8 and 9, the upper end of valve rod 158 is attached to a gear sector 216 which meshes with a spur gear 218 rotated by a DC motor 220. More particularly, motor 220 is located in a bore 222 in the upper end fitting 48. The spur gear 218 is fastened to the motor shaft 224 by a retainer 226. Both the motor 220 and the spur gear 218 are accurately positioned relative to the gear sector 218 by screws 228. The DC motor 220 rotates the spur gear 218 to pivot the gear sector 216, valve rod 158 and the pilot valve from their normal dampening positions to their lockout positions. The DC motor 220 is reversed to pivot the pilot valve back to its normal dampening position by reversing the polarity of the motor leads.

In FIG. 8, the gear sector 216 in solid lines is shown in an intermediate position between its dampening position and its lockout position. The numeral 230 labels the dampening position of gear sector 216 which is shown by broken lines. When the shock absorber is changed from the dampening mode of operation to the lockout mode of operation, the DC motor 220 pivots gear sector 216 from the damping position 230 to a lockout position 232. Prior to reaching the lockout position 232, a pin 237 on the gear sector 216 contacts arm 238 of switch yolk 234 to throw a double pole-double throw switch (DPDT) 236. This switching terminates motor energization and reverses the polarity of the motor leads.

To return the shock absorber to normal operation the DC motor 220 is energizable to pivot the gear sector 216 from the lockout position 232 to the dampening position 230. Prior to reaching the position 230, a pin 239 on the gear sector 216 contacts arm 238 of the switch yolk 234 which throws switch 236. This switching terminates motor energization and once again reverses the polarity of the motor leads. Actual switching is carried out by bent portions 240 and 241 on the switch yolk 234 which alternately contact a switch arm 242 of switch 236. A strap 243 and screws 244 secure the DPDT switch 236 to the end fitting 48.

Figure 10:
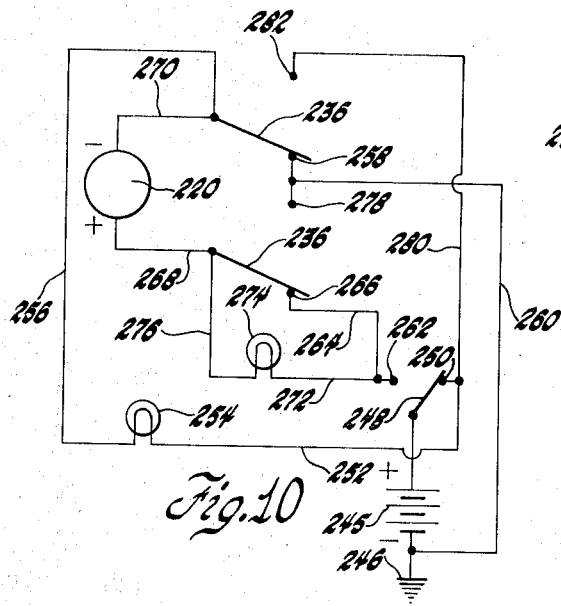
FIG. 10 is a circuit diagram with associated switches in a position in which the shock absorber dampens movement between the sprung and unsprung masses of an associated vehicle.

FIGS. 10, 11, 12 and 13 illustrate a single circuit diagram with the DPDT switch 236 in alternate positions to control the shock absorber mode of operation. In the FIGS., a DC power source or battery 245 illustrated with its negative terminal grounded at 246 and with its positive terminal connected to a manually operated single pole-double throw switch (SPDT) 248 which is located in the vehicle interior. The switch arms of the DPDT switch 236 are connected to leads of the DC motor 220. FIG. 10 illustrates the position of switches 236 and 248 during the shock absorber's normal dampening mode of operation. The switch arm 248 is against a contact 250 which completes a circuit from the positive terminal of battery 245 through switch 248, contact 250, conductor 252, a shock-open indicating light 254, conductor 256, the upper switch arm 236, a contact 258 and a conductor 260 to the negative terminal of the battery 245.

Figure 11:
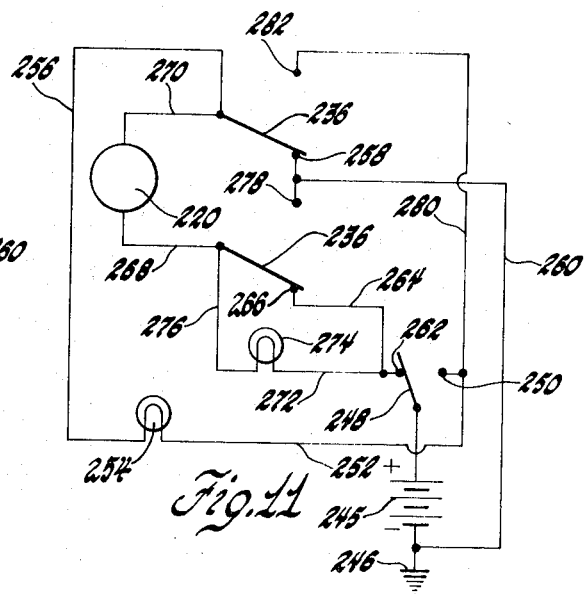
FIG. 11 is a circuit diagram with associated switches in a position which energizes the DC motor to effect shock absorber lockout.

FIG. 11 illustrates the position of switches 236 and 248 during the period in which the motor 220 is activated to change the shock absorber from a normal dampening mode to a lockout mode. Switch arm 248 is thrown from contact 250 to contact 262 which completes a circuit from the positive terminal of battery 245 through switch arm 248, contact 262, conductor 264, contact 266, the lower switch arm 236, lead 268, motor 220, lead 270, the upper switch arm 236, contact 258 and conductor 260 to the negative terminal of battery 245. Note the polarity of motor 220. When the gear sector 216 reaches lockout position 232, bent portion 240 on the switch yolk 234 moves the switch arms 236 to the position illustrated in FIG. 12 which terminates motor energization.

Figure 12:
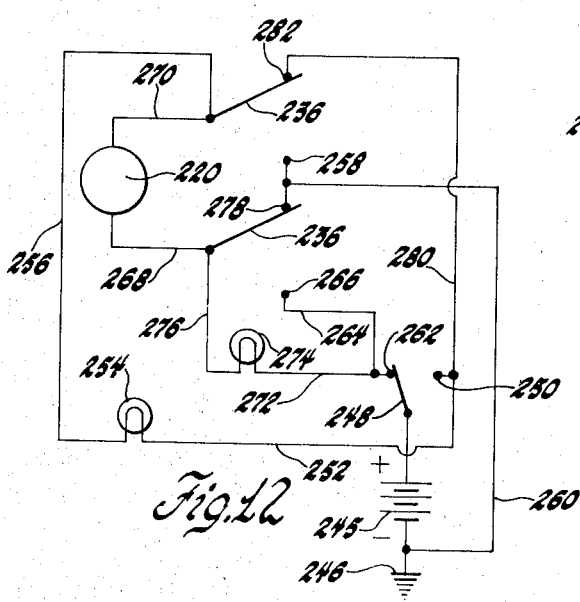
FIG. 12 is a circuit diagram with associated switches in a lockout position in which the shock absorber precludes movement between sprung and unsprung masses of an associated vehicle.

FIG. 12 shown the position of the switches 236 and 248 while the shock absorber is in the lockout mode of operation. A circuit then extends from the positive terminal of battery 245 through switch arm 248, contact 262, conductor 272, a shock-closed indicating light 274, conductor 276, the lower switch arm 236, a contact 278 and conductor 260 to the negative terminal of battery 245.

Figure 13:
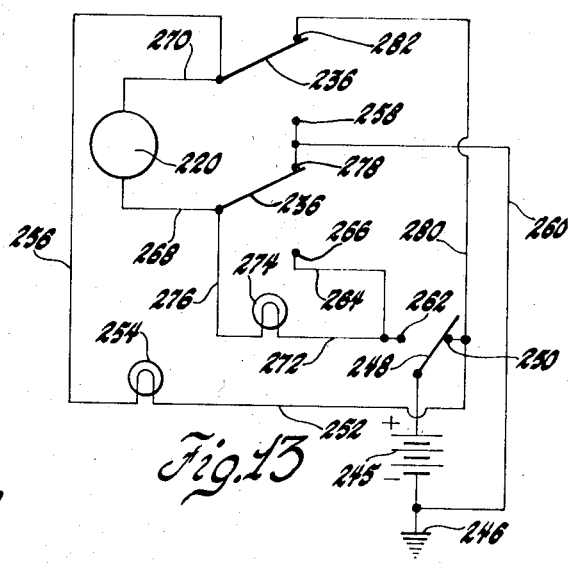
FIG. 13 is a circuit diagram with associated switches in a position which energizes the DC motor to reeffect normal shock absorber dampening.

To return the shock absorber from the lockout mode of operation to a normal damping mode of operation, the switch 248 is thrown from contact 262 to contact 250. FIG. 13 illustrates the position of switches 236 and 248 during a period in which the motor 220 is activated to return the shock absorber from a lockout mode to a damping mode of operation. A circuit extends from the positive terminal of battery 245 through switch arm 248, contact 250, conductor 280, contact 282, the upper switch arm 236, lead 270, motor 220, lead 268, switch arm 236, contact 278 and conductor 260 to the negative terminal of battery 245.

It should be understood that other motor control circuits are contemplated including switch means other than those shown in the preferred embodiment. Particularly, electronic relays and hot wire relays are considered. Nor does the lead reversing switch need to be automatically thrown. It may be manually actuated.

While the embodiment of the present invention as herein described constitutes a preferred form, it is to be understood that other forms may be adapted.

I claim:

1. A hydraulic direct acting shock absorber alternately having a normal dampening mode of operation and a lockout mode of operation comprising: a cylindrical pressure cylinder tube; valved piston means within said pressure cylinder tube for the regulation of fluid flow therethrough during the dampening mode of operation; a cylindrical bypass tube concentrically around said pressure cylinder tube and forming an annular bypass passageway therebetween; a reservoir tube concentrically around said bypass tube forming an annular reservoir chamber therebetween; a piston rod concentrically within said pressure cylinder tube for reciprocating said piston means in said pressure cylinder tube; piston rod sealing means encircling said piston rod and supported within one end of said pressure cylinder tube to prevent fluid leakage therebetween a base valve means on another end of said pressure cylinder tube for regulating fluid flow from said bypass passageway into said reservoir chamber and for regulating fluid flow from said reservoir chamber into said compression chamber; a variable volume rebound chamber within said pressure cylinder tube between said piston means and said sealing means; a variable volume compression chamber within said pressure cylinder tube between said piston means and said base valve means; said piston means including a cylindrical valve having a small diameter end and a large diameter end integrally joined by a variable diameter intermediate portion; said valve being supported at its small and larger diameter ends within said piston means for axial reciprocation between open and closed positions; a spring which normally biases said valve into a closed position; means for exposing said small diameter end of the valve to fluid pressure in said compression chamber which causes said valve to move into an open position against the force of said spring in response to a predetermined pressure level within the compression chamber; fluid passageway means for exposing said intermediate portion of the valve to fluid pressure in said rebound chamber which causes said valve to move into an open position against the force of said spring in response to a predetermined pressure level within the rebound chamber; a rotatable pilot valve within said piston means adjacent said large diameter end of the valve; reversible rotative drive means operably attached to said pilot valve to pivot said pilot valve between a normal dampening position and a lockout position; fluid passage means in said pilot valve for transmitting fluid pressure from said rebound and compression chambers against said large diameter end of said cylindrical valve when the pilot valve is in a lockout position and whereby pressure forces on said large diameter end of the valve counterbalance pressure forces on said small diameter end of the valve and on said intermediate portion of the valve to maintain said valve in a closed position by said spring force and consequently to prohibit reciprocation of said piston means within said pressure cylinder tube.

2. A hydraulic direct acting shock absorber alternately having a normal dampening mode of operation and a lockout mode of operation comprising: a pressure cylinder tube; valved piston means within said pressure cylinder tube for the regulation of fluid flow therethrough during the dampening mode of operation; a reservoir tube concentrically around said pressure cylinder tube and enclosing an annular reservoir chamber therein; a piston rod concentrically within said pressure cylinder tube for reciprocating said piston means and said pressure cylinder tube; piston rod sealing means encircling said piston rod and supported within one end of said pressure cylinder tube to prevent fluid leakage therebetween; a variable volume rebound chamber and a variable volume compression chamber on opposite sides of said piston means within said pressure cylinder tube; said piston means including a cylindrical valve having a small diameter end and a large diameter end integrally joined by a variable diameter intermediate portion; said valve being supported at its small and large diameter ends within said piston means for axial reciprocation between open and closed positions; a spring which normally biases said valve into a closed position; means for exposing said small diameter end of the valve to fluid pressure in said compression chamber which causes said valve to move into an open position against the force of said spring in response to a predetermined pressure level within the compression chamber; fluid passageway means for exposing said intermediate portion of the valve to fluid pressure in said rebound chamber which causes said valve to move into an open position against the force of said spring in response to a predetermined pressure level within the rebound chamber; a rotatable pilot valve within said piston means adjacent said large diameter end of the valve; reversible rotative drive means operably attached to said pilot valve to pivot said pilot valve between a normal dampening position and a lockout position; fluid passage means in said pilot valve for transmitting fluid pressure form said rebound and compression chambers against the said large diameter end of said cylindrical valve when the pilot valve is in a lockout position and whereby pressure forces on said large diameter end of the valve counterbalance pressure forces on said small diameter end of the valve and on said intermediate portion of the valve to maintain said valve in a closed position by said spring force and consequently to prohibit reciprocation of said piston means within said pressure cylinder tube.

3. A hydraulic direct acting shock absorber alternately having a normal dampening mode of operation and a lockout mode of operation comprising: a pressure cylinder tube; valved piston means within said pressure cylinder tube for the regulation of fluid flow therethrough during the dampening mode of operation; a bypass tube concentrically around said pressure cylinder tube and forming an annular bypass passageway therebetween; a reservoir tube concentrically around said bypass tube forming an annular reservoir chamber therebetween a piston rod concentrically within said pressure cylinder tube for reciprocating said piston means in said pressure cylinder tube; piston rod sealing means encircling said piston rod and supported within one end of said pressure cylinder tube to prevent fluid leakage therebetween; a variable volume rebound chamber and a variable volume compression chamber on opposite sides of said piston means within said pressure cylinder tube; base valve means on another end of said pressure cylinder tube for regulating fluid flow from said bypass passageway to said reservoir chamber and for regulating fluid flow from said reservoir chamber into said compression chamber; said piston means including a cylindrical valve having a small diameter end and a large diameter end integrally joined by a variable diameter intermediate portion; said valve being supported at its small and large diameter ends within said piston means for axial reciprocation between open and close positions; a spring which normally biases said valve into a closed position; means for exposing said small diameter end of the valve to fluid pressure in said compression chamber which causes said valve to move into an open position against the force of said spring in response to a predetermined pressure level within the compression chamber fluid passageway means for exposing said intermediate portion of the valve to fluid pressure in said rebound chamber which causes said valve to move into an open position against the force of said spring in response to a predetermined pressure level with the rebound chamber; a rotatable pilot valve within said piston means means adjacent said large diameter end of the valve; reversible rotative drive means operably attached to said pilot valve to pivot said pilot valve; said drive means including a DC motor for pivoting said pilot valve between a normal dampening position and a lockout position; circuit means connecting said DC motor to a DC power source including first and second switch means coactive together in the circuit to energize said DC motor to pivot said pilot valve between its dampening position and its lockout position and to deenergize said DC motor when said pilot valve attains its dampening and lockout positions; said first switch means operably connected to said pilot valve to reverse the polarity of the DC motor leads after pivoting said pilot valve between dampening and lockout positions; said second switch means being selectively operable to energize said DC motor through said first switch means; fluid passage means in said pilot valve for transmitting fluid pressure from said rebound and compression chambers against said large diameter end of said cylindrical valve when the pilot valve is in a lockout position and whereby pressure forces on said large diameter end of the valve counterbalance pressure forces on said small diameter end of the valve and on said intermediate portion of the valve to maintain said valve in a closed position by said spring force and consequently to prohibit reciprocation of said piston means within said pressure cylinder tube.

4. A shock absorber as set forth in claim 3; and pressure relief passage means in said pilot valve for withdrawing fluid pressure forces from said large diameter end of the valve when said pilot valve is in a dampening position.

5. A shock absorber as set forth in claim 3; said drive means including a gear which is attached to and rotated by said DC motor; a gear sector coactive with said rotative gear; a valve rod extending axially through said piston rod and attached at one end to said pilot valve and attached at another end to said gear sector.

6. A shock absorber as set forth in claim 3; said piston means including a high pressure relief valve which is opened to permit fluid flow from said compression chamber to said rebound chamber in response to a predetermined fluid pressure in said compression chamber.